No. 683,817.　　　　　　　　　　　　　　Patented Oct. 1, 1901.
H. A. & W. TRIPP.
APPLE PARER.
(Application filed Nov. 5, 1900.)
(No Model.)　　　　　　　　　　　　　　　　5 Sheets—Sheet 1.
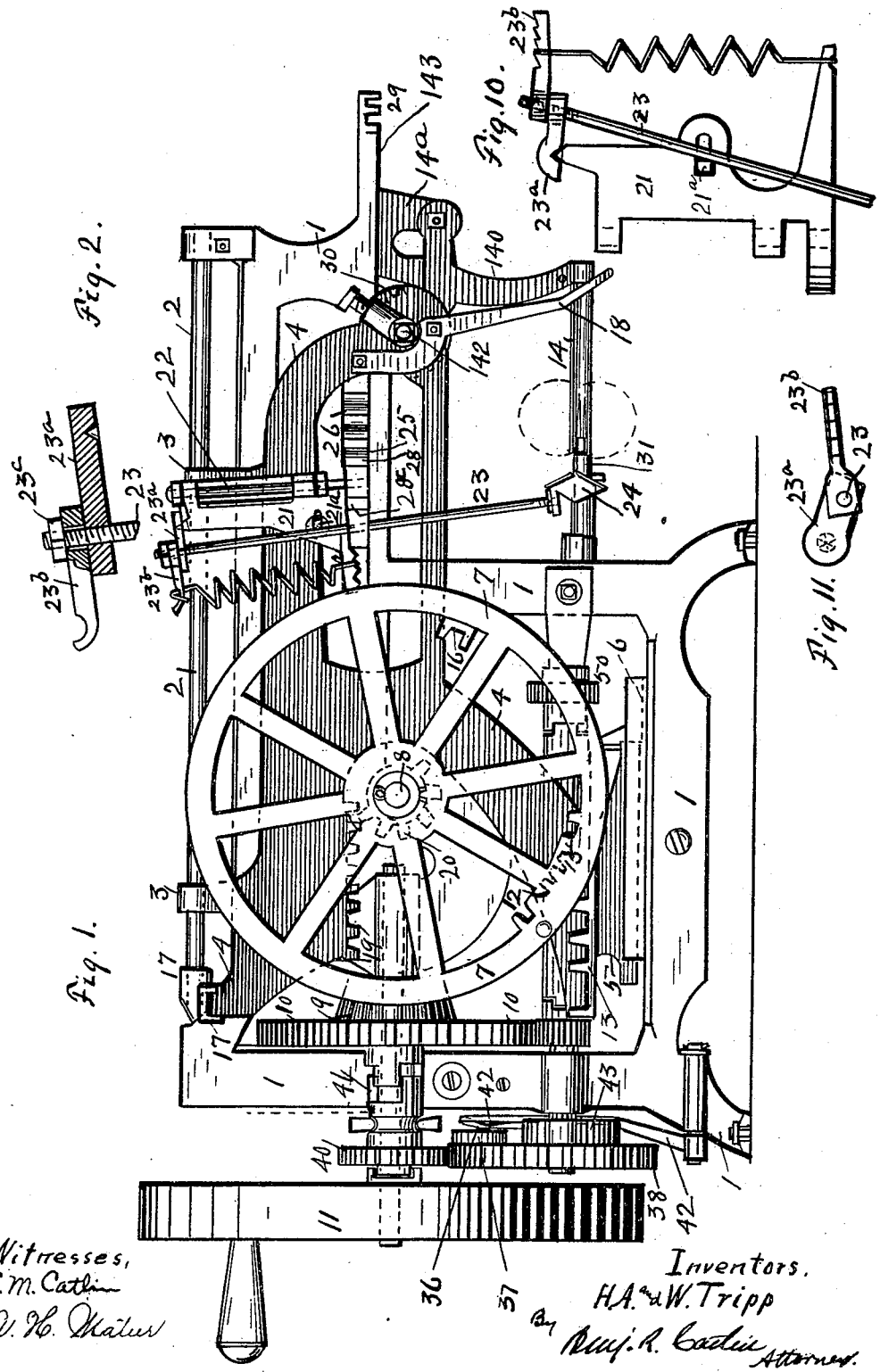
Witnesses,
C. M. Catlin
A. H. Mater
Inventors,
H. A. & W. Tripp
By Benj. R. Catlin
Attorney No. 683,817. Patented Oct. 1, 1901.
H. A. & W. TRIPP.
APPLE PARER.
(Application filed Nov. 5, 1900.)
(No Model.) 5 Sheets—Sheet 2.
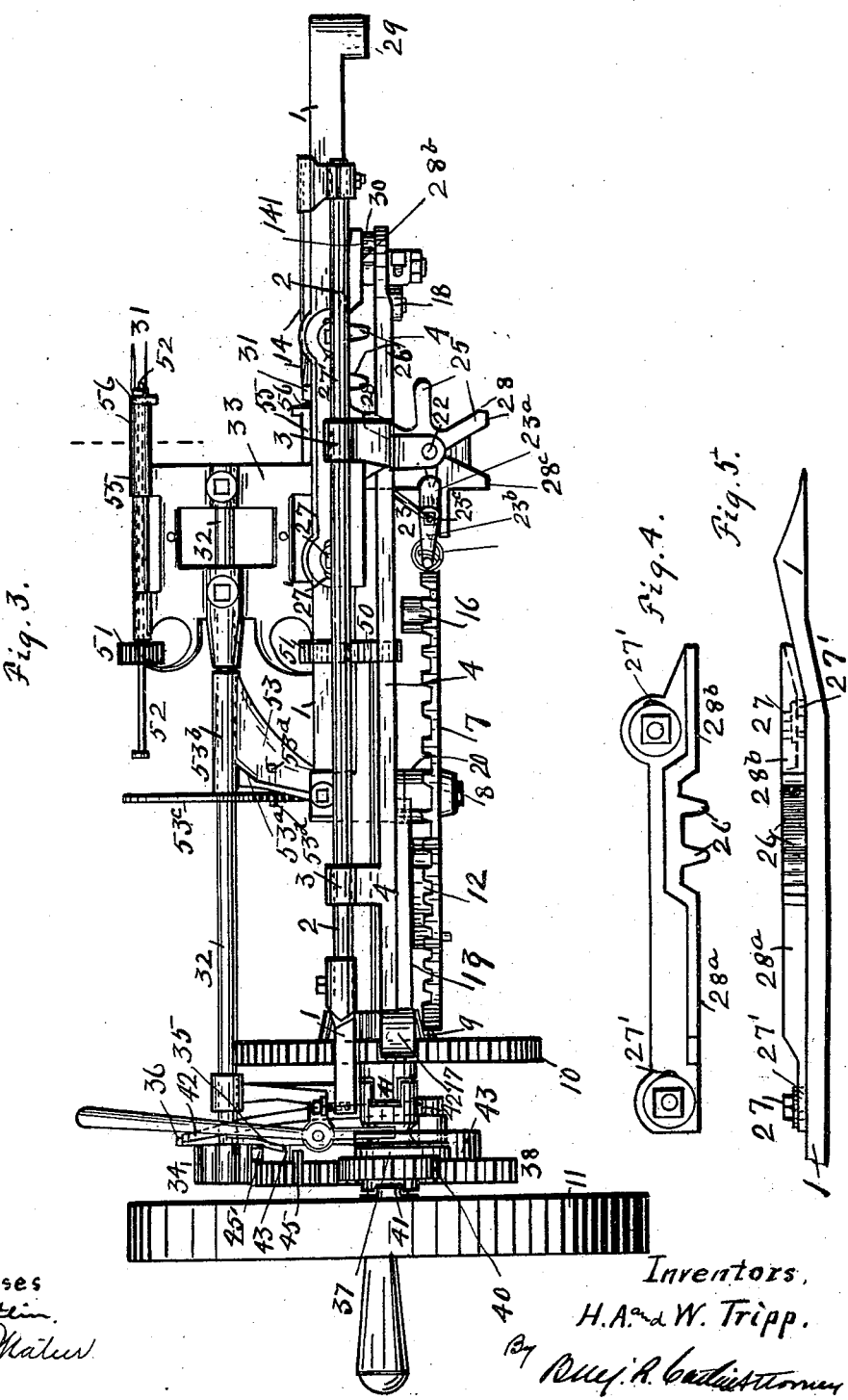
Witnesses
Inventors,
H. A. and W. Tripp.

No. 683,817.
H. A. & W. TRIPP.
APPLE PARER.
(Application filed Nov. 5, 1900.)
Patented Oct. 1, 1901.
(No Model.)
5 Sheets—Sheet 3.
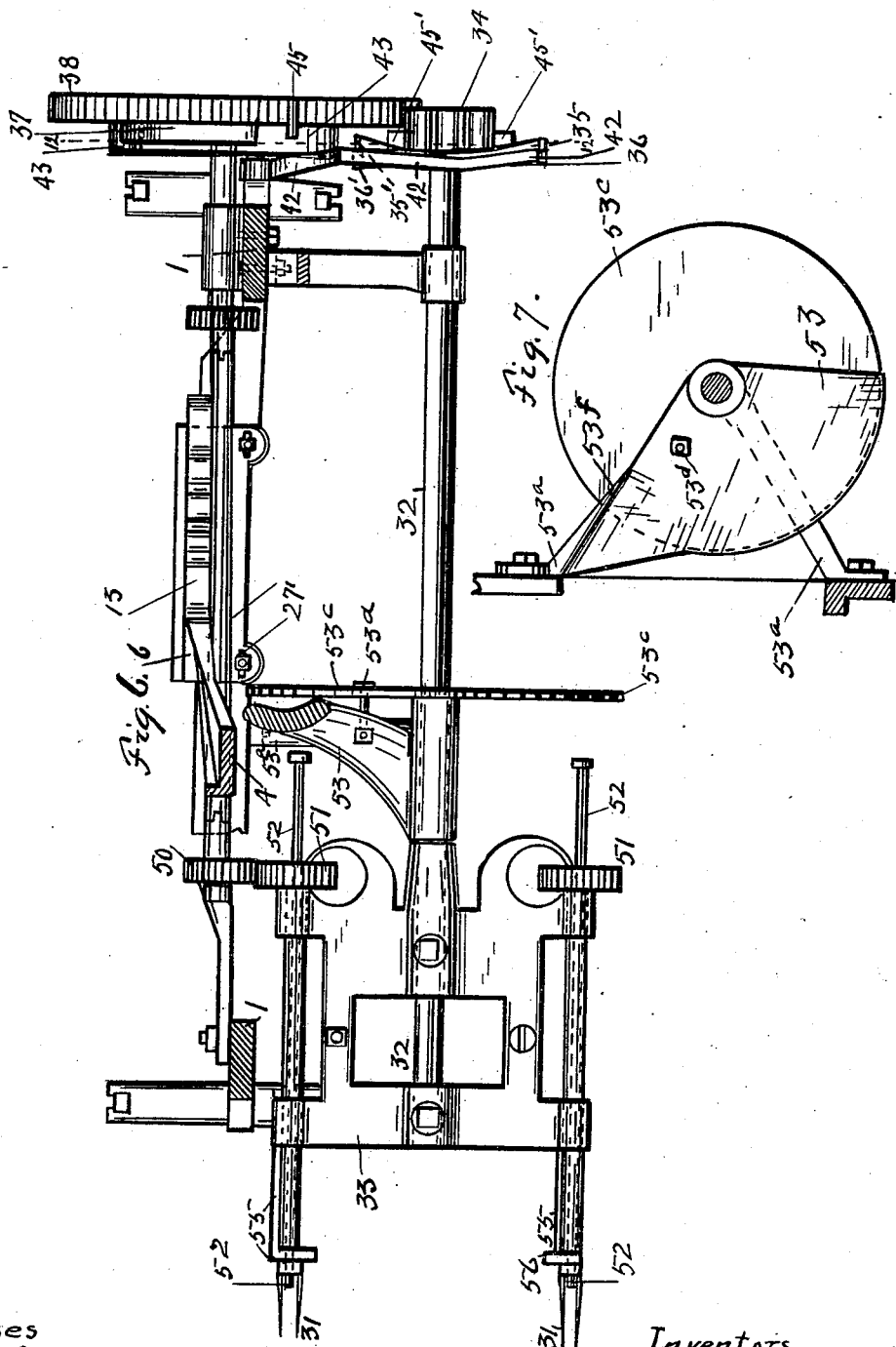
Witnesses
C. M. Catlin
A. H. Mather
Inventors
H. A. & W. Tripp.
By
Benj. R. Catlin, attorney No. 683,817. Patented Oct. 1, 1901.
H. A. & W. TRIPP.
APPLE PARER.
(Application filed Nov. 5, 1900.)
(No Model.) 5 Sheets—Sheet 4.
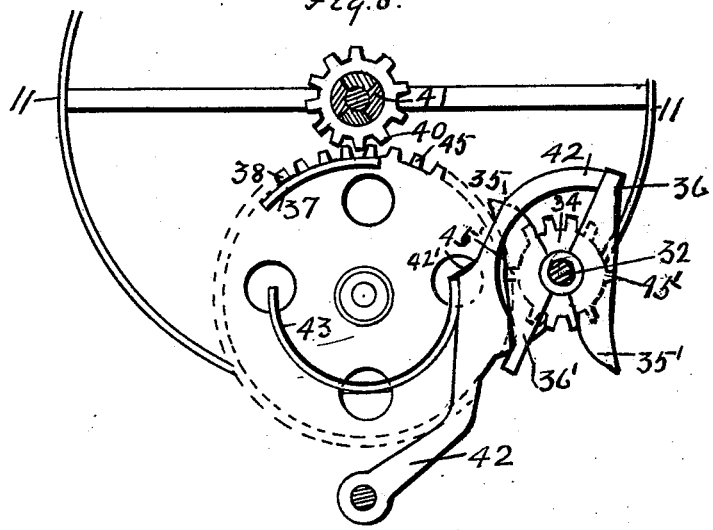
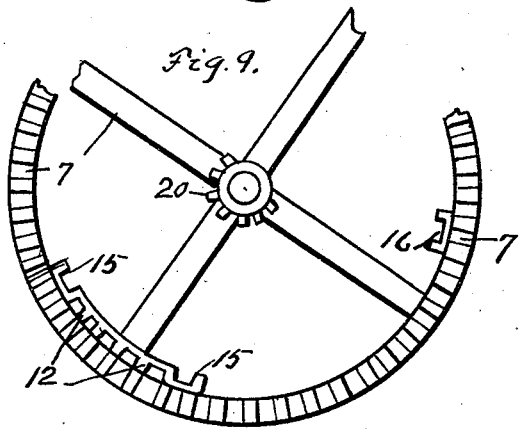
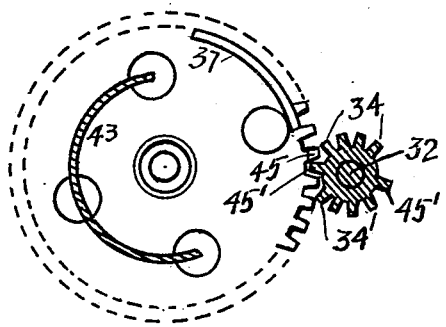
Witnesses
C. M. Catlin
A. H. Mater
Inventors
H. A. & W. Tripp
By
Benj. R. Catlin, attorney No. 683,817. Patented Oct. 1, 1901.
H. A. & W. TRIPP.
APPLE PARER.
(Application filed Nov. 5, 1900.)
(No Model.) 5 Sheets—Sheet 5.
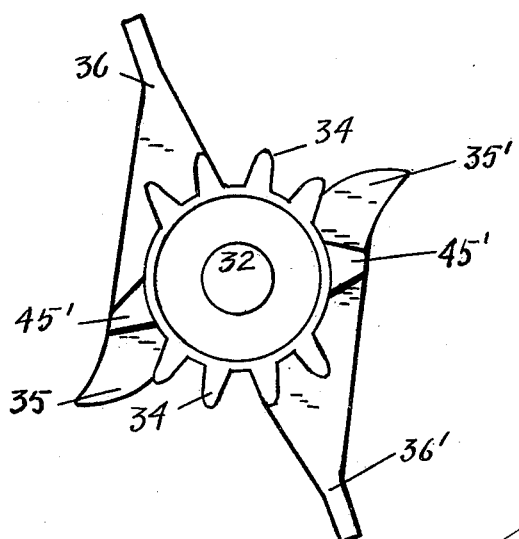
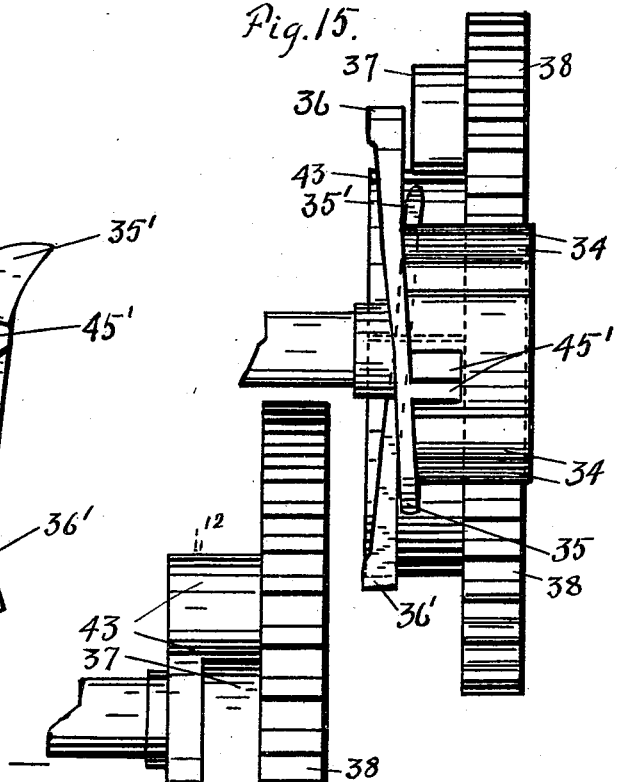
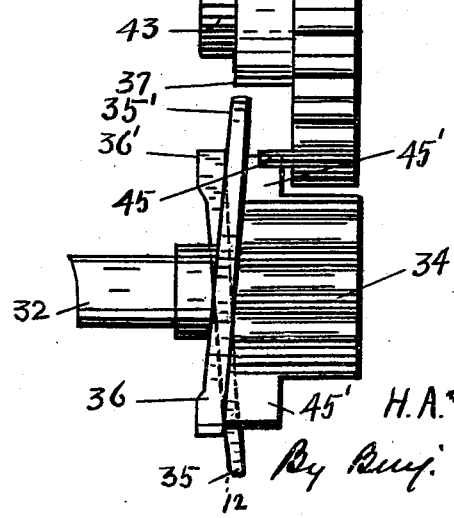
Witnesses
C. M. Catlin
A. H. Mathew
Inventors
H. A. & W. Tripp
By Benj. R. Catlin
Attorney

UNITED STATES PATENT OFFICE.

HENRY A. TRIPP AND WALTER TRIPP, OF SODUS, NEW YORK.

APPLE-PARER.

SPECIFICATION forming part of Letters Patent No. 683,817, dated October 1, 1901.

Application filed November 5, 1900. Serial No. 35,519. (No model.)

*To all whom it may concern:*

Be it known that we, HENRY A. TRIPP and WALTER TRIPP, residents of Sodus, in the county of Wayne and State of New York, have invented certain new and useful Improvements in Apple-Parers; and we do hereby declare the following to be a full, clear, and exact description of the invention, such as will enable others skilled in the art to which it pertains to make and use the same.

This invention relates to that class of apple-parers having a carriage adapted to be reciprocated and carrying a swinging knife-frame.

One object of our invention is to provide improved means for reciprocating such carriage in such manner as to give it and the knife or parer a slow movement while the apple is being pared and a comparatively rapid return movement for economizing time.

Another object is to provide improved means for swinging the knife-frame and also to provide improved means for locking the forks.

Other subordinate features will hereinafter appear.

In the accompanying drawings, Figures 1 and 3 are a rear side view and a plan view of the paring-machine. Fig. 2 is a central vertical section of a part of the swinging knife apparatus. Fig. 4 is a plan view of a rack bar or plate. Fig. 5 is a side view thereof secured to the frame. Fig. 6 is a plan view of the double forks and operating devices, with parts of the machine in section. Fig. 7 is a side view of the cam for operating the core-ejectors. Fig. 8 is a partial side and sectional view of the forks and locking and controlling means. Fig. 9 is a similar view of the carriage-moving wheel. Fig. 10 is a side view of a modified pivot-arm for the swinging knife-frame, and Fig. 11 is a plan thereof. Fig. 12 is a partial sectional view on line 12 12 of Fig. 13, and Fig. 13 is an enlarged partial plan. Fig. 14 is a full-size end view of the four-arm and mutilated gear device, and Fig. 15 is a side view of Fig. 13 looking from the bottom of the sheet.

1 indicates a rigid frame, the top of which is a tube or rod 2, on which bearings 3 are adapted to slide, said bearings forming the upper support of the carriage 4, and 5 being a foot or base of said carriage adapted to slide in the grooved way 6 on frame 1. Said way is formed of two L-shaped plates bolted together and to the frame by bolts on the front side of the machine. The bolt-holes in the L-shaped plates are elongated to allow proper adjustment of the plates.

7 is a crown-wheel on a fixed axle 8. The crown gear-teeth mesh with the pinion 9, connected with gear-wheel 10 on a shaft of the hand-wheel or other drive-wheel 11.

12 is a rack-segment on wheel 7, with teeth at right angles to the crown-teeth and in position during a part of each revolution to engage the rack 13, forming a part of the carriage.

As shown in Fig. 1, an apple has just been pared and the corer 14 has just been thrust into the apple to cut out the core, but has not been withdrawn or moved reversely to take the apple from the fork. The corer is pivotally supported by means of arm 140, rigidly attached to disk 141, rotatable on stud 142, fixed in the disk-like end of the carriage 4.

$14^a$ is an arm secured to arm 140, and the upper end of which is adapted to bear against a track or bar 143, which is a part of the main frame. Said arm $14^a$ braces the arm 140 while the corer is being forced into the apple. At the time when the arm 140 is turning on stud 142 arm $14^a$ has been carried along beyond the rack 29 and is carried up by the end of bar 143 and over the same, thus not interfering with the turning of the corer-arm on its axis. Teeth 29 extend into the plane of teeth 30 enough to mesh sufficiently to operate the corer. By strengthening the shade-line at 29, Fig. 3, the showing has been improved. The drawings show gear 34 with two groups of teeth, four teeth in each group, with spaces between the groups without teeth. It should be noted that in Fig. 12, 45' are not gear-teeth adapted to mesh with gear 34, but are teeth or lugs not extending into the plane of wheel 38. The rack-segment 12 is just engaging rack 13 to move the carriage toward the right to bring the knife into position to pare another apple, the paring being done while the knife is moving from right to left, Fig. 1. The rack-segment 12, being near the outer periphery of the wheel, has a rapid movement and moves carriage 4 rapidly to the right. The end teeth 15 of rack 12 are enlarged in thickness and so shaped as to engage the correspondingly-enlarged end spaces of rack 13 and to readily engage and disengage therefrom. The forward tooth 15 starts rack 13 and brings the following teeth into engagement. The advantage of the enlarged tooth 15 of gear 12 and the enlarged corresponding recess of rack 13 is important. It will be seen that the carriage has been moving toward the left, Fig. 1, under the operation of gear 20 and rack 19 and that when these parts cease to coact the carriage will have a tendency to continue its movement, due to its momentum, and that as the engagement of gear 12 and rack 13 operates to return the carriage to its normal position at the right of the machine they must first arrest the movement of the carriage toward the left. Experiment has demonstrated that in the case of an ordinary tooth for this purpose it will wear to such an extent as to become practically useless in a short time. Hence we enlarge the tooth and its corresponding recess to effect the object. Although the intermediate teeth of rack 12 are shown much less coarse than the end teeth, this is not essential, provided the end teeth are sufficiently large.

16 is a lug at about ninety degrees from the rack-segment 12 and in position to move under the arm 17 of carriage 4, said carriage and its arm 17 having been previously moved to the right by gear 12 and rack 13, bringing arm 17 into the path of movement of lug 16. This general construction and operation are old and shown in our Patent No. 572,689, where said parts are in engagement. Lug 16 is so located that it will engage said arm just after an apple has been removed by the discharger 18, the effect being to move the carriage rapidly toward the left until rack 19 on carriage 4 is brought into engagement with the mutilated gear 20 on the hub of wheel 7. This gear, being near the center of wheel 7, will advance the carriage slowly while the apple is being pared.

21 is the knife-frame, pivoted on pin 22, supported by the carriage.

21$^a$ is a bolt adjustable in the elongated bolt-hole in frame 21 and forming a stop for the knife-rod. By adjusting the bolt the knife can be accurately placed forward or backward in relation to the fork.

23 is a rod carried by frame 21 and supporting the knife or parer 24. The arm 23$^a$, which bears on a pivot-point on frame 21, screws onto rod 23. Preferably the arm 23$^b$ slips loosely onto the rod and both it and arm 23$^a$ are held by check or lock nut 23$^c$; but we may have the upper arm 23$^b$ screw on and itself form a lock-nut for arm 23$^a$. In the latter case the two arms may not be exactly in line with each other, (see Fig. 11,) but will be nearly so. This will be due to the fact that the upper arm bears against the lower arm before the former comes into said line. By making the arm at top of the knife-arm in two parts the knife-head can better be adjusted in relation to the fork. It gives a side adjustment, which is as essential as the adjustment forward or backward.

The bottom of frame 21 is extended on both sides of the pivot, on one side forming three knife-frame-swinging teeth 25, of equal lengths and in position to engage with the rack 26, having corresponding teeth and firmly but adjustably fixed to the stationary frame 1. The rack, which is separate and independent of the frame, is secured by bolts 27, extending through the body of the rack and through the frame, the holes in the rack being elongated, as shown at 27'. This adjustment provides for conveniently placing the rack in exactly the right relation to the teeth on frame 21. The two outer of said teeth have opposite bevels 28, one of which (on each tooth) when frame 21 is moved to the limit of its swing forward or backward rests flat against the vertical flange or face 28$^a$ or 28$^b$ of the rack-body. The other bevel of the tooth, resting against the frame, engages the first tooth of rack 26, after which the following teeth 25 engage the rack, thus completing the swing of the knife-frame at a uniform speed. On the opposite side of the pivot are lugs 28$^c$, with faces in line with bevels or faces 28, which also rest against the flange 28$^a$ or 28$^b$, thus steadying the knife-frame.

29 represents rack-teeth on the frame 1, which as carriage 4 moves toward the right are engaged by teeth 30, thereby swinging the corer back, as described in our Patent No. 572,689, of December 8, 1896.

Preferably two forks 31 are used, being supported on an axis 32, supported by frame 1 in such manner that one fork is exposed for placing an apple thereon while the other fork is supporting the apple being pared. Just after the latter apple has been discharged the body 33, carrying the two forks at its opposite sides, turns half-way around, reversing the positions of the forks, bringing a fresh apple into position to be pared.

34 is a mutilated gear on axis 32 and is normally locked against rotation by the four arms 35 35' 36 36', rigidly secured to the gear 34 and coöperating parts. Arms 35 35' coöperate alternately with the short flange 37, projecting from the inner face of gear-wheel 38, which is driven by pinion 40 on the driving-shaft. Flange 37 comes between radii corresponding to the ends of flange 43. 41 is a clutch. Arms 36 36' coöperate with the arm 42, which is controlled by a flange 43, concentric with flange 37, but not constituting a complete circle, being broken away substantially as shown in Fig. 8. In advance of the short flange 37 wheel 38 has an elongated tooth 45, which projects out to one side from one face of the wheel, but only projects radially about as far as the gear-teeth, and as wheel 38 turns the tooth engages a lug or tooth 45' of wheel 34, turning axis 32 and connected parts, bringing gear 34 into mesh with wheel 38, completing reversal of the forks. As shown in Fig. 12, the teeth of wheel 38 do not normally engage the teeth of the mutilated gear 34, since the teeth of the latter do not extend over the part of wheel 34 facing wheel 38. In said figure tooth 45 is just engaging tooth 45' to turn wheel 34 far enough to bring one group of its gear-teeth into engagement with wheel 38. The arm 35 or 35', as the case may be, passes under flange 37, and arm 36 or 36' pushes pivoted arm 42 backward between the separated ends of flange 43. The rotation continues until the opposite arm 35' or 35 reaches the outer face of flange 37, which has advanced so as to be under said arm, and arm 42 is moved forward against arm 36' or 36 and is then held against said arm by flange 43 while the apple is being pared, cored, drawn from the fork, and the core ejected, when the fork-shaft is again given a half-turn, as above described. Lugs or teeth 45' are not in the same plane as wheel 38, but are in a plane at one side thereof. Tooth 45 projects to one side of wheel 38 into the plane of lugs 45', so as to alternately engage said lugs.

In the construction shown in our Patent No. 669,714 the outer flange 37 is in position to lock the four-armed device for nearly the entire revolution of the wheel by the bearing against said flange of one of the arms 35 or 35', and for a large part of the revolution said device is also locked by the inner concentric flange 43 acting through a lever on the alternate arm 36 or 36'. In the present construction the short outer flange does not lock the four-armed device simultaneously with the inner flange 43, but only for a short period during the passage of the removed section of flange 43 by lever 42. This shortening of the flange 37 effects a saving in material and weight and also a reduction in friction, as the short flange 37 is for the greater part of the time out of contact with the four-armed device.

Lever 42 has a shoulder 42', which prevents turning the drive-wheels, except in one direction. If started reversely, one end of flange 43 will engage shoulder 42', the lever being moved into the path of the flange end by arm 35 or 35', and stop the machine. Gear 34 has two groups of teeth, each group only sufficient to move the forks about a half-circle, when they again become locked.

50 is a wheel which engages wheels 51 on the forks to rotate them alternately.

52 represents core-ejectors, and 53 is a plate arranged at an angle with the core-ejectors in such manner that as the forks are reversed the core-ejector moving to the front is pushed longitudinally, throwing out the core of the last apple pared. Plate 53 is cast integral with a bracket 53$^a$ and bearing 53$^b$ for shaft 32.

53$^c$ is a disk or plate secured to the bracket, as by bolt 53$^d$. Its purpose is to complete the circle of plate 53, which, as shown, is but an arc or segment of a circle. It is not essential that part 53$^c$ be a separate piece from plate 53 and the bearing. Plates 53 and 53$^c$ make it impossible for the core-ejectors to work back out of their tubes. Hence the forward ends thereof need not be enlarged, as heretofore. Plate 53 bevels off to an edge 53$^f$ where the plate reaches disk 53$^c$.

The outward movement of the corer and the first part of the return movement—that is, the movement caused by lug 16 engaging arm 17—are rapid; but the rest of the return movement, while the corer is entering the apple, is slower, since the carriage is then being moved by rack 19 and gear 20.

55 represents curved plates, which lie along the fork-shafts extending out from plate 33 to prevent flexure or vibration of said shafts in use. Said plates have end flanges 56, which prevent apples from being pushed on too far.

The adjustable bracket 53$^f$, Figs. 3 and 6, that holds one end of the fork-reel shaft, is on the front of the machine, so that instead of adjusting the rear shaft up to the reel-shaft as the parts wear, as in our prior machine, we adjust said bracket 53$^f$ by means of its upper securing-nut 53$^g$ and the reel-shaft toward the rear shaft. The other bracket 53$^a$ for this shaft is preferably formed integral with the cam-plate 53 for moving the core-ejector rods.

The machine being constructed as set forth, the operation is, briefly, as follows: Wheel 11, as seen in Fig. 1, is driven in the direction of the hands of a clock, together with wheels 9, 10, and 40 on the same shaft. Wheel 9 drives wheel 7 oppositely to the hands of a clock. The forward enlarged tooth 15, engaging the first enlarged space of rack 12, starts the rack, together with the carriage 4 and the swinging knife-frame, rapidly to the right. During this movement tooth 28, which is next to flange 28$^b$, strikes the first tooth 26, Figs. 3 and 4, which starts the swinging knife-frame toward the right, (opposite to its paring movement.) Continued movement of frame 4 causes the second and then the third tooth 25 (all of equal radial length) to operate to swing the frame uniformly to its supreme position at the right, (which in use is its initial position.) Before the carriage reaches the end of its movement to the right, but after the knife-frame has completed its movement, the gear-teeth 30 reach and engage teeth 29 at the end of the frame, which swings corer 14 backward, withdrawing the apple last pared from its fork, and when the apple reaches arm 18 it is pushed thereby from the corer. Simultaneously with the above-described operations wheel 38 is turned by wheel 40 and oppositely thereto, and before the knife-frame completes its swing tooth 45 on wheel 38 strikes tooth 45' on mutilated gear 34, turning shaft 32 and body 33 and bringing the second fork, with its apple, into paring position and discharging the core from the fork last used by means of rod 52 and cam 53. Shaft 32 can turn when tooth 45 engages tooth 45', because flange 43 has at that moment left projection 42', and lever 42 is free to be moved back by arm 36. When shaft 32 begins to turn, the arm 35 passes in front of and below short flange 37, and said shaft continues to turn one hundred and eighty degrees—that is, until arm 35' strikes the outer face of flange 37, which arrests the shaft 32, and immediately thereafter flange 43 comes against lever 42 and holds it against arm 36', again locking the shaft 32. This operation occurs just before the knife reaches the apple during the rapid advance of the carriage 4, carrying the knife to the apple in position to be pared, this movement being effected by lug 16 on wheel 7 engaging arm 17 of the carriage. Just as or just before the knife reaches the apple teeth 20 on the hub of wheel 7 engage rack 19 on the carriage, moving the latter slowly while the apple is being pared. During this part of the return movement of the carriage the teeth 26 and 25 engage and swing the knife-frame, carrying it again to the position shown in Fig. 1, thereby completing the paring of the apple, after which it is discharged, &c., as above described.

Having thus described our invention, what we claim as new, and desire to secure by Letters Patent, is—

1. The combination, in an apple-parer, of a plurality of forks carried by a central shaft, means for locking and releasing said forks for reversing their position consisting of a driven wheel 38 having interrupted flanges 37, 43 at different distances from the center, flange 37 being short and between radii passing through the ends of flange 43, lever 42, and a body secured to the central fork-shaft and having arms controlled, one directly, and one through said lever 42, by the flanges for locking the fork-shaft.

2. The combination of a frame, a carriage movable thereon, a wheel mounted on the frame and having a rack-segment 12 near its periphery, a straight rack 13 on the carriage to be engaged by the rack-segment on the wheel, a lug 16 also near the periphery of said wheel, an arm on the carriage adapted to be engaged by said lug after the rack-segment 12 has operated, a second straight rack on the carriage nearer its axis than the first rack, a small mutilated gear adapted to engage the latter rack to move the carriage slowly after operation of lug 16, a swinging knife-frame, and means for swinging said knife-frame at a uniform speed during the movement given the carriage by the latter rack and the mutilated gear.

3. The combination in an apple-parer of a frame, a carriage, a swinging knife-frame pivotally supported by the carriage, the knife-supporting rod, an arm near the top thereof into which said rod screws, said arm bearing on a pivot on the swinging knife-frame, a second arm on the knife-rod above the first-mentioned arm but bearing against it and adapted to occupy different angular positions relative to the first-mentioned arm, a spring secured at one end to the second arm and at the other end secured to the swinging knife-frame.

4. The combination in an apple-parer of a frame, a carriage, a swinging knife-frame pivotally supported by the carriage, the knife-supporting rod, an arm near the top thereof into which said rod screws, said arm bearing on a pivot on the swinging knife-frame, a second arm on the knife-rod above the first-mentioned arm but bearing against it and adapted to occupy different angular positions relative to the first-mentioned arm, a spring secured at one end to the second arm and at the other end secured to the swinging knife-frame, and a check-nut on the rod pressing against the said second arm.

5. The combination of the paring-machine frame, the carriage movable thereon, the swinging knife-frame mounted on the carriage, the knife-rod and knife supported by said knife-frame, the three equal teeth projecting from the swinging frame the outer teeth having beveled ends, a fixed rack with corresponding teeth on the machine-frame for swinging the knife-frame and plane surfaces at opposite ends of the rack forming sliding bearings for the beveled teeth.

6. The combination of the paring-machine frame, the carriage movable thereon, the swinging knife-frame mounted on the carriage, the knife-rod and knife supported by said knife-frame, the three equal teeth projecting from the swinging frame the outer teeth having beveled ends, lugs whose outer ends are in the same plane with the outer bevels of said teeth, faces against which the ends of the lugs and teeth are adapted to slide, and fixed rack-teeth to swing the knife-frame.

7. The combination of the parer-frame, the rotatable fork-body, the plurality of forks thereon, the shaft, the core-ejecting rod in each fork, the bracket forming the shaft-bearing adjacent to the forks, and the cam for moving the core-ejecting rods integral with said bracket.

8. The combination of the parer-frame, the rotatable fork-body, the plurality of forks thereon, the shaft, the core-ejecting rod in each fork, the bracket forming the shaft-bearing adjacent to the forks, the cam for moving the core-ejecting rods integral with said bracket, and an extending plate connected to the bracket and completing the circle of the core-ejector cam-surface.

In testimony whereof we have signed this specification in the presence of two subscribing witnesses.

HENRY A. TRIPP.
WALTER TRIPP.

Witnesses:
WILLIAM B. NEWELL,
WARNER H. CURTIS.